March 8, 1966 R. G. LOUGHARY 3,239,268
PROTECTIVE DEVICE FOR DOORS OF MOTOR VEHICLES
Filed March 10, 1964 2 Sheets-Sheet 1
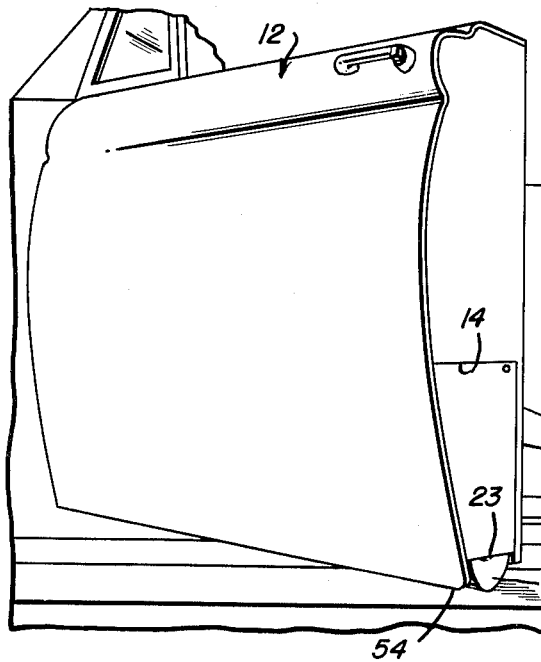
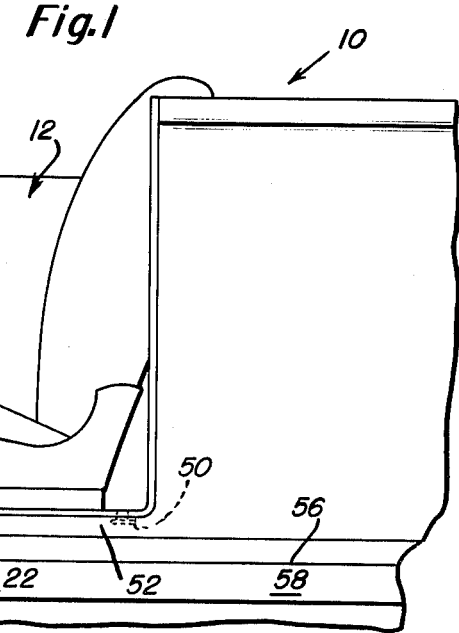
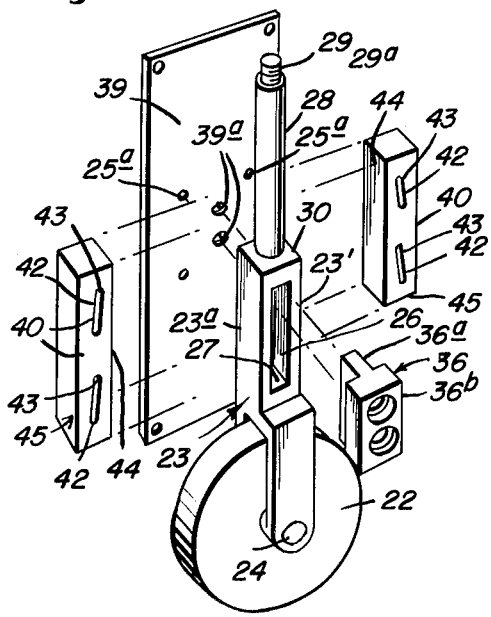
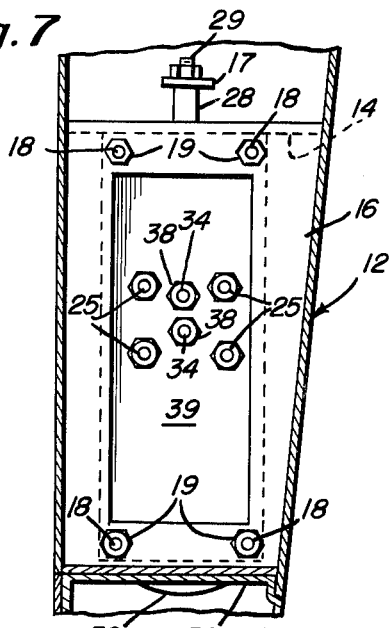
INVENTOR
Roy G. Loughary
BY John A. Mackinney
ATTORNEY March 8, 1966 R. G. LOUGHARY 3,239,268
PROTECTIVE DEVICE FOR DOORS OF MOTOR VEHICLES
Filed March 10, 1964 2 Sheets-Sheet 2
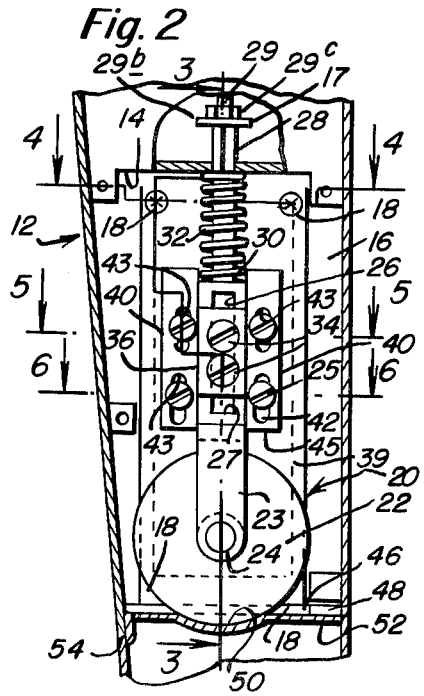
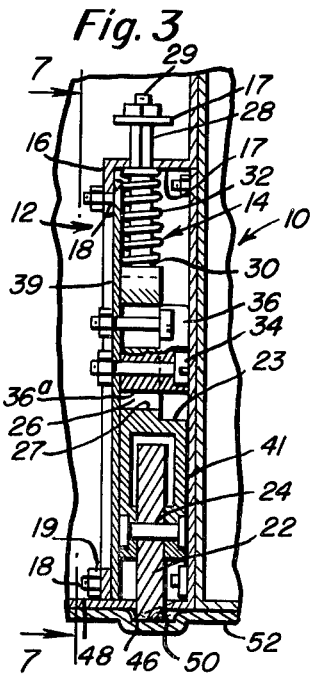
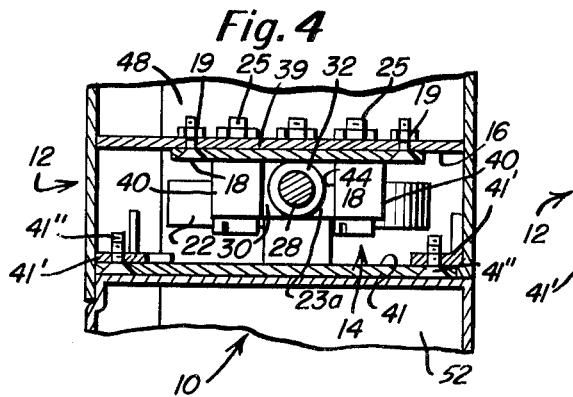
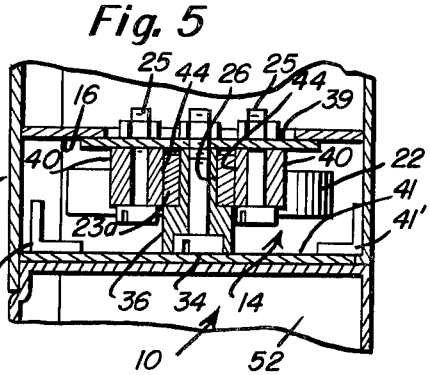
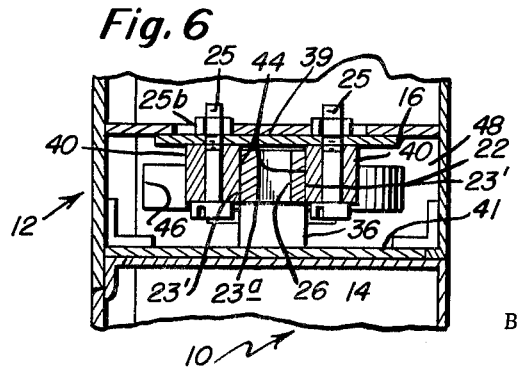
INVENTOR
Roy G. Loughary
BY John A. Mawhinney
ATTORNEY United States Patent Office 3,239,268
Patented Mar. 8, 1966

3,239,268
PROTECTIVE DEVICE FOR DOORS OF
MOTOR VEHICLES
Roy G. Loughary, P.O. Box 6727, Portland, Oreg.
Filed Mar. 10, 1964, Ser. No. 350,854
8 Claims. (Cl. 296—44)

The present invention relates to a protective device for doors of motor vehicles and has for an object the provision of a device of this kind which is normally housed within the confines of the door to which it is applied and automatically projects a roller below the lower edge portion of the door to engage the adjacent curb or other surface to protect the door from scraping thereon when the door is opened.

In the modern designs of automobiles considerable emphasis is placed on mounting the chassis and the body low so that there is a minimum of clearance over a curb or other surface when opening either the front or rear doors as the case may be to exit a passenger or driver in the usual manner.

It is therefore an important object of the present invention to provide the lower edge portion of the automobile door with a roller or roller surface which contacts or engages the upper surface of the curb when the door is swung to its open position to lift the vehicle body and door sufficiently to prevent the vehicle door from scraping or binding on the curb surface.

Another object of the present invention is a provision of a roller for allowing the vehicle door to clear an otherwise impassably high curb.

Still another object of the present invention is to provide a simply constructed compact unit assembly for adjustably mounting a surface contacting roller in the door of the vehicle to prevent damage to the lower leading edge of the door.

The present invention aims to provide a device of this character which will set up a tighter fit or snugness between the vehicle door and its frame to prevent rattling of the door when the vehicle is travelling, especially over rough terrain.

Further and attendant advantages will be apparent when referring to the disclosure of the present invention along with the accompanying drawings wherein like reference characters apply to the several parts thereof in the several figures of the drawings therethrough and wherein:

FIGURE 1 is a perspective view illustrating a preferred embodiment of the present invention, FIGURE 2 is an end elevational view of the device with the cover plate removed and parts broken away and parts shown in section, FIGURE 3 is a vertical sectional view taken on the line 3—3 of FIGURE 2 with the door closed, FIGURE 4 is an enlarged longitudinal sectional view taken on the line 4—4 of FIGURE 2, FIGURE 5 is an enlarged sectional view taken on the line 5—5 of FIGURE 2, FIGURE 6 is an enlarged sectional view taken on the line 6—6 of FIGURE 2, FIGURE 7 is a vertical sectional view taken on the line 7—7 of FIGURE 3 illustrating the method of attaching the fixed elements of the invention, and FIGURE 8 is an exploded perspective view of the adjusting elements of the device.

Referring to the disclosure in the drawings and more particularly to a novel illustrative embodiment there is disclosed an automobile 10 of a modern design commonly referred to as the "two door sedan type." Each of the two doors 12 has a section of the door removed or cut away from its lower free edge by any suitable means to provide an aperture or recess indicated at 14.

Seated in the aperture 14 and attached to the rear wall 16 thereof by means of four screws 18 preferably engaging four nuts 19 which in turn are welded or otherwise secured to the rear wall 16 is a mounting plate 39 of the protective device assembly indicated generally at 20.

The assembly 20 comprises a roller or wheel 22 receivably and rotatably mounted in a forked shaped retaining member 23 by means of an axle 24. The forked shaped member 23 has an elongated rectangular shaped in cross section guide shoe portion 23a provided with a vertically extending elongated slot 26 formed therein, the purpose of which will be explained later in the specification. Extending upwardly from the upper end of the portion 23a and integral therewith is a shank 28 having its upper free end portion threaded as at 29 of reduced diameter to provide an upwardly facing shoulder 29a. The shank 28 may be round in cross section and has a cross section of lesser diameter than that of the guide shoe portion 23a to provide an upwardly facing shoulder 30 on the upper face of the portion 23a.

Disposed between the shoulder 30 of the portion 23a and the horizontal portion 17 of the rear wall 16 is a coiled tension spring 32, the use of which will be explained later in the specification.

The member 23 is mounted for vertical sliding movement on a mounting plate 39 by a T-shaped positioning key 36, the leg 36a of which extends through the slot 26 of the shoe portion 23a. A pair of bolts 34 extend through suitable openings in the key 36 and registering openings 39a in the plate 39 and are received by nuts 38 secured as by welding or the like to the back of the plate 39. The leg of the T-shaped key 36 is of less height than the length of the slot 26. The leg 36a of the key 36 has a thickness substantially equal to the width of the slot 26 so as to prevent lateral or rocking movement of the member 23 on the key and the head 36b of the key has a thickness substantially the same as the width of the shoe portion 23a so that the head 36b overlies and engages the portion 23a to prevent movement of the member 23 away from the plate 39.

A pair of guide blocks 40 are secured to the plate 39 on each side of the member 23 in sliding engagement with the adjacent surfaces 23' of the guide shoe portion 23a. Bolts 25 extend through slots 42 formed in the blocks 40 and through suitable apertures or openings 25a in the plate 39 and are received by nuts 25b secured to the rear face of the plate 39 by welding or the like. Each block has a surface 44 which engages the adjacent surface 23' of the member 23 so as to guide the member 23 in a straight vertical path. In order to compensate for wear of the engaging surafces 23' and 44, the slots 42 are angled or inclined upwardly and inwardly towards the surfaces 44.

A cover plate 41 is removably attached to elements 41' carried by the inner and outer sides of the door 12 by fastening elements 41'', such as screws or the like, to enclose the recess 14 so as to protect the assembly 23 against the weather and the ingress of dirt or other foreign matter. An opening 46 is provided in the bottom wall 48 of the door 12 which opening 46 communicates with the recess 14 to permit the projection of the roller 22 through and below the bottom wall 48 of the door under the influence of the spring 32.

When the door 12 is in its closed position, the roller 22 of the assembly 20 under the influence of the spring 32 extends through the opening 46 in the bottom wall 48 of the door 12 and is forcibly seated in a semi-circular recess 50 in the bottom 52 of the door frame of the automobile 10 by means of the tension spring 32 acting against the shoulder 30 of the portion 23a and the horizontal portion 17 of the rear wall 16. The roller 22 and the forked shaped member 23 are restricted in vertical movement by the slot 26 in the portion 23a.

In the operation of the device, assuming that the door is in its closed position with the roller 22 positioned in the recess 14 and received by the semi-circular recess 50 of the door frame and an occupant of the vehicle wishes to alight when the vehicle is parked adjacent a curb, the occupant will open the door 12 and as the door swings outwardly the roller 22 is cammed out of the semi-circular recess 50 in the body of the car against the tension of the spring 32 and as the door continues to swing outwardly the roller by virtue of the force of the spring 32 will be moved downwardly so that the roller 22 extends below the lower edge 54 of the door 12. As the door continues to swing outwardly the roller 22 will engage the gutter edge 56 of the curb 58 urging the roller 22 and the forked member 23 upwardly against the action of the tension spring 32 so that the bottom edge 27 of the slot 26 in the member 23a will approach but will not engage the lower face 36a of the leg of the member 36 unless the roller engages an unusually high curb or other obstacle. During the continued outward movement of the door to its fully opened position the roller is resiliently projected beyond the lower edge 54 of the door and resiliently supports the door thereby preventing the bottom edge 54 of the door 12 engaging the curb or other obstacle to prevent damage to the door and to prevent hanging up or binding of the door on the curb or other obstacle.

Should the curb or other obstacle encountered by the roller 22 be excessively or unusually high the roller 22 and the member 23 may be forced upwardly against the action of the spring 32 until the face 27 of the slot 26 engages the lower face 36a of the leg of the T-shaped member 36. In this event the bolts 34 may be sheared off so that, when the shearing force of the obstacle is removed by moving the door towards its closed position, the spring 32 will again come into play and force the roller 22 and the member 23 downwardly so that the roller and member 23 would be forced down and below the bottom 48 of the door and might escape entirely from the recess 14 or extend below the bottom 52 of the door frame to prevent closing of the door by the roller 22 engaging the bottom 52.

In order to prevent this an abutment in the form of a collar or washer 29b is positioned on the threaded end 29 of the shank 28 and held in abutting relation with the shoulder 29a by a nut 29c. The collar 29b will prevent the excessive downward movement or escape of the roller 22 and member 23 by engaging the upper face of the horizontal portion 17 of the rear wall 16 should the bolts 34 be sheared off.

After continued operation in the aforementioned manner the parallel sides 23' of the number 23a and/or the surfaces 44 of the blocks 40 may become worn resulting in a loose, noisy fit between the sides 23' and surfaces 44. When this occurs the bolts 25 positioning the guide blocks 40 are loosened slightly and the blocks 40 will be tapped lightly at the bottom end 45 thereof urging them upwardly in convergent slots 42 until a snug, slidable relationship is again established between the surfaces 44 and the sides 23' of the member 23. The bolts 25 will then be retightened.

The provision of the recess 50 in the door frame bottom 52 which receives the spring tensioned roller 22 insures a tight snug fit between the door 12 and the door frame so that rattling and vibration of the door when in closed position is prevented even when the vehicle is travelling over rough terrain.

The use of this device will prevent the lower edge of the door from engaging or becoming embedded in the ground when articles of great weight are being placed in the vehicle or when an unusually heavy person is entering or leaving the vehicle.

Although I have disclosed herein the best form of the invention known to me at this time, I reserve the right to all such modifications and changes as may come within the scope of the following claims.

What is claimed is:

1. For use with a vehicle door having a recess therein and an opening in the bottom wall thereof communicating with the recess, a protective device for preventing damage to the door when in its open position and when being moved between its fully opened and closed positions comprising a mounting plate adapted to be attached to the door within the recess, a retaining member, a wheel rotatably supported by the retaining member, means for connecting said retaining member with said plate for limited vertical movement with respect to the plate between high and low positions so that the roller will be projected from the recess, through the opening in the bottom of the wall and into engagement with the surface adjacent the vehicle when said retaining member is in a lowered position, resilient means for moving the retaining member to its lowered position comprising a spring adapted to engage a fixed part of the door and engaging said retaining means, guide means for guiding said retaining member in its vertical movements comprising a pair of guide blocks carried by said mounting plate at each side of said retaining member and having guide surfaces in engagement with the adjacent surfaces of the retaining member, and adjusting means for attaching said blocks to said plate comprising upwardly and inwardly inclined slots in the blocks and fastening elements extending through said inclined slots and releasably engaging said plate so that the blocks can be adjusted to compensate for wear of the engaging surfaces of the blocks and retaining member.

2. For use with a vehicle door having a recess therein and an opening in the bottom wall thereof communicating with the recess, a protective device for preventing damage to the door when in its open position and when being moved between its fully opened and closed position comprising a mounting plate adapted to be attached to the door within the recess, a retaining member, a wheel rotatably supported by the retaining member, means for connecting said retaining member with said plate for limited vertical movement with respect to the plate between high and low positions so that the roller will be projected from the recess, through the opening in the bottom wall of the door and into engagement with a surface adjacent the vehicle when said retaining member is in a lowered position, resilient means for moving the retaining member to its lowered position comprising a spring adapted to engage a fixed part of the door and engaging said retaining means, guide means for guiding said retaining member in its vertical movement including said connecting means, said retaining member having a vertically elongated slot for receiving said connecting means said connecting means comprising a T-shaped key having a leg of a thickness substantially equal to the width of said slot and a heighth less than the length of said slot and a head having a thickness substantially equal to the width of said retaining member and having overlapping engagement with the retaining member to prevent movement of the retaining member away from said mounting plate, and cooperating fastening means on said plate and engaging said key to maintain the key in its operative position with respect to the retaining member.

3. A protective device as claimed in claim 2, wherein said key and fastening means limit the vertical downward movement of the retaining member and wheel during normal operation of the device, means are provided for preventing escape of the retaining member and the wheel from the door recess in the event said fastening means becomes broken, said last named preventing means comprising an abutment carried by the upper end portion of said member and adapted to engage a fixed part of the vehicle door in the event the fastening means is broken.

4. A protective device for protecting the lower edge of automobile doors from scraping or becoming hung up on surfaces adjacent the automobile when the door is being moved between its open and closed positions and in its open position comprising a self contained assembly including a mounting plate adapted to be secured to the door, a forked shaped retaining member, a roller rotatably carried by said member, means for mounting said member on said plate for vertical movement thereon comprising a guide shoe portion on said member having a vertically extending elongated slot therein, a T-shaped key having a leg projecting into said slot to limit the downward movement of the retaining member and a head overlying the sides of the slot on the side thereof remote from said plate, cooperating fastening means on said plate and engaging said key for retaining the key in its operative position, a shank extending upwardly from the guide shoe portion and having a diameter of less dimension than the cross-sectional dimension of the guide shoe portion to provide an upwardly facing shoulder, a coil spring encircling said shank and having its lower end seated on said shoulder and its upper end adapted to engage a fixed part of the door so as to urge the retaining member and the roller downwardly, an abutment on the upper free end portion of the shank and adapted to engage a fixed part of the door to arrest the downward movement of the retaining member and the roller in the event the retaining member and roller tend to have excess downward movement due to failure of the key to limit the downward movement of the retaining member and the roller, a pair of guide blocks on each side of said guide shoe portion and having surfaces engaging adjacent surfaces of said guide shoe portion, and adjusting means for attaching said blocks to said plate comprising upwardly and inwardly inclined slots in the blocks and fastening elements extending through said inclined slots and releasably engaging said plate.

5. For use with the door of a vehicle having a door frame and a recess therein, a protective device for preventing damage to the door when in its open position and when being moved between its fully opened and closed positions comprising a moveable member including an element and a roller rotatably carried by the element adapted to be mounted on the vehicle door, and resilient means comprising a spring adapted to abut a fixed part of the vehicle door and abutting said element for resiliently projecting the roller below the lower edge of the door during the opening and closing movements of the door and when the door is in its open position and for forcing said roller into said recess when the door is in its closed position.

6. For use with a vehicle door having a recess therein and an opening in the bottom wall thereof communicating with the recess, a protective device for preventing damage to the door when in its open position and when being moved between its fully open and closed positions, comprising a mounting plate attached to the door within the recess, a retaining member having a vertically elongated slot, a wheel rotatably supported by the retaining member, means for connecting said retaining member with said plate for limited vertical movement with respect to the plate between high and low positions so that the roller will be projected from the recess, through the opening in the bottom wall of the door and into engagement with a surface adjacent the vehicle when said retaining member is in a lowered position, resilient means for moving the retaining member to its lowered position comprising a spring in engagement with a fixed part of the door and engaging said retaining means, and guide means for guiding said retaining member in its vertical movement including said connecting means comprising a T-shaped key having a leg received in said vertically elongated slot in the retaining member.

7. A protective device as claimed in claim 6 further comprising a cover plate attached to the vehicle door to seal off the door recess and protect the parts of the device against the elements and the ingress of foreign matter to the recess.

8. A protective device as claimed in claim 6, wherein the said guide means including a pair of guide blocks carried by said mounting plate at each side of said retaining member and having guide surfaces in engagement with the adjacent surfaces of the retaining member.

References Cited by the Examiner
UNITED STATES PATENTS

| | | | |
|---|---|---|---|
| 2,213,461 | 9/1940 | Ellis. | |
| 2,664,598 | 1/1954 | Grieg | 20—19 |
| 2,834,608 | 5/1958 | Wixson | 293—69 |
| 3,090,084 | 5/1963 | Banner. | |

FOREIGN PATENTS 608,570 11/1960 Canada.

BENJAMIN HERSH, *Primary Examiner.*

A. HARRY LEVY, *Examiner.*

P. GOODMAN, *Assistant Examiner.*